(No Model.)
E. & J. P. REICHART.
CULTIVATOR.
No. 377,273. Patented Jan. 31, 1888.
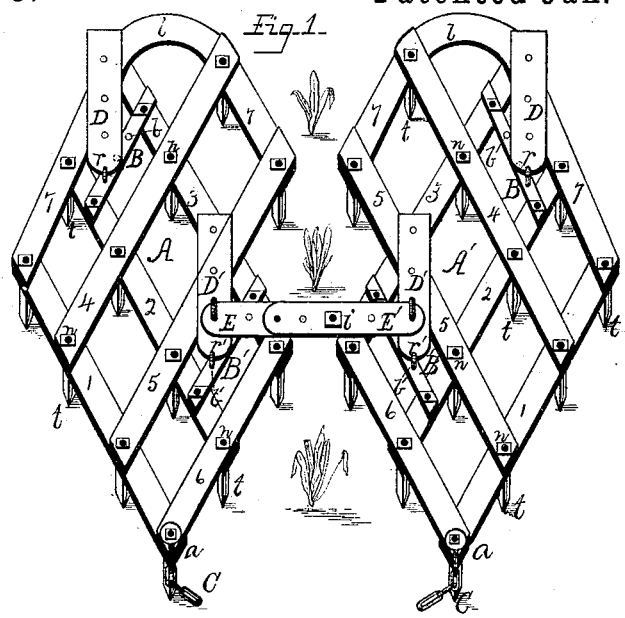
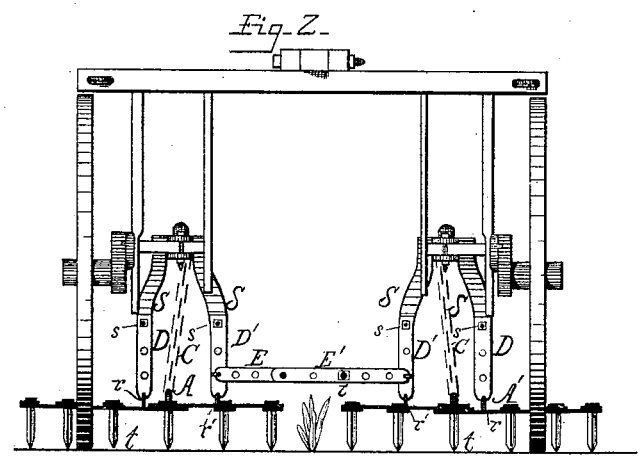
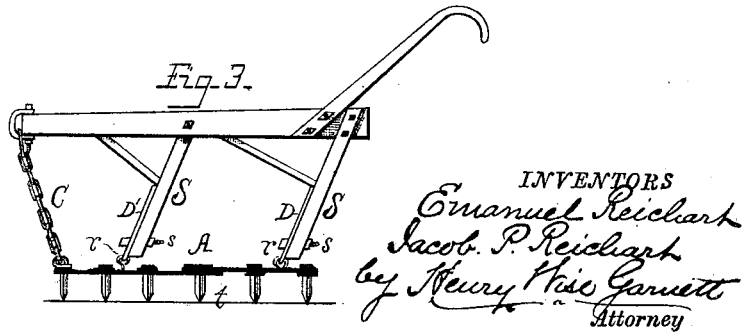
WITNESSES
J. B. Johns
Wm. N. Brereton
INVENTORS
Emanuel Reichart
Jacob P. Reichart
by Henry Wise Garnett
Attorney

UNITED STATES PATENT OFFICE.

EMANUEL REICHART AND JACOB P. REICHART, OF NEOLA, IOWA.

CULTIVATOR.

SPECIFICATION forming part of Letters Patent No. 377,273, dated January 31, 1888.

Application filed December 18, 1886. Renewed August 8, 1887. Serial No. 246,433. (No model.)

*To all whom it may concern:*

Be it known that we, EMANUEL REICHART and JACOB P. REICHART, both citizens of the United States, residing at Neola, in the county of Pottawattamie and State of Iowa, have invented certain new and useful Improvements in Cultivators; and we do hereby declare the following to be a full, clear, and exact description of the invention, such as will enable others skilled in the art to which it appertains to make and use the same.

Our invention is an improvement in cultivators, particularly that class of implements termed "straddle-row wheel-cultivators;" and our said invention consists, first, of a frame of novel construction which carries the cultivator teeth or blades, and, second, in certain novel means applied to said frame whereby the same may be adjustably and removably secured in position to an ordinary double-shovel plow, as and for the purposes as will be hereinafter more fully explained and form the subject-matter of the claims.

The object of this invention is to adapt the ordinary double-shovel plow for use as a cultivator or harrow; and to accomplish this a suitable frame is provided which carries the harrow or cultivator teeth, to which frame adjustable straps are secured, whereby, to convert the plow into a harrow or cultivator, the plow points or shovels are removed from the standards of said plow, and the harrow-frame secured in position to said standards by means of the adjustable straps aforesaid, which straps are arranged upon said frame in such position necessary to properly engage said standards.

For a better understanding of the details of construction of our invention, reference must now be had to the accompanying drawings, in which—

Figure 1 represents a perspective view of two frames constructed according to our invention, arranged in position for use as a straddle-row cultivator, the supporting-frame or running-gear and plows being omitted. Fig. 2 represents a front elevation of our harrow or cultivator frames as applied in position upon two double-shovel plows for use as a straddle-row wheel-cultivator. Fig. 3 represents a side elevation of a single frame as applied in position to an ordinary double-shovel plow for use as a single cultivator.

A A' represent the frames of the cultivator, which are composed of seven pieces, preferably of narrow strap-iron, three of which, as at 1 2 3, extend at an angle in one direction, while the other three pieces, 4 5 6, extend in an opposite angle and upon the top of the members 1 2 3, the parts being held together by the cultivator-teeth *t*, whose shanks pass through each member of the frame at their intersecting points and are supplied upon their top ends with nuts *n*. The seventh member, 7, of the frame, also made of strap-iron, connects the outer ends of the members 1 2 3 together, and then, after bending laterally, as at *l*, forms the outer connection for the two members 4 5. By arranging the parts of the frames in the manner described, said frames are caused to assume a triangular shape, at the apex *a* of which the draft-chains C are applied. Instead of harrow-teeth being employed, as here shown, cultivator teeth or shovels of any desired form, and arranged to throw the earth either to or from the plants, may be employed in place thereof, and when desired for use as a straddle-row cultivator two such frames are employed, as in Figs. 1 and 2. This constitutes the construction of the frame for carrying the teeth. Now, to employ said frame we proceed as follows: At suitable points upon said frame are secured two cross-bars, B B', having adjustment-holes *b b'*, through which pass ring-bolts *r r'*, which carry short perforated bars D D'. The positions of these parts B and B' are such relatively to the standards of an ordinary double cultivator that said standards will be in proper position to receive upon their faces, in the same position occupied by their shovels, the bars D D', whereby the frame is secured in position upon an ordinary double-shovel cultivator-plow, as shown in Figs. 2 and 3.

To prevent lateral movement of the frames, when two are employed as a straddle-row cultivator, as in Figs. 1 and 2, the forward standard of each plow is joined together by means of two perforated bars, E E', one end of each of which is linked to the bars D and D', while the other ends are secured together by a bolt, *i*.

To convert a double-shovel plow into a harrow or cultivator, the shovels are first removed from the standards S S. The plow is then placed upon the frame A and the bars D and D' secured in the same position as that occupied by the shovels—that is, upon the standards S S—the bolts $s$, that secure the shovels, being employed to secure the bars D D' in place. The draft-chains C are then secured to the plow-clevis, as shown in Figs. 2 and 3, when the implement is ready for use as a cultivator.

As before stated, any form of teeth or blades may be applied to the frame, and either two such frames used at once as a straddle-row cultivator, as in Fig. 2, or only one frame used as an ordinary single cultivator, as in Fig. 3.

We are aware that it is not new to attach harrow-frames to the standard ends of drag-bars or plow-beams, or to substitute such harrow-frames for the shovels or teeth usually carried by wheel-cultivators. Hence we claim only our special construction of frames and the manner of their attachment.

Having thus fully described our invention, what we claim as new therein, and desire to secure by Letters Patent of the United States, is as follows, viz:

1. In a cultivator, in combination with the frame A, carrying teeth or cultivator-blades $t$, substantially such as herein described, and an ordinary double-shovel plow having standards to which the usual cultivator blades or points are attached, the cross-bars B B', having adjustment-holes $b\ b'$, ring-bolts $r\ r'$, and perforated bars D D', secured to said frame, whereby said frame is secured to the plow, for the purposes specified.

2. In a cultivator, in combination with a suitable wheeled supporting-frame and two ordinary double-shovel plows, the two frames A A', each supplied with cross-bars B B', ring-bolts $r\ r'$, and bars D D', secured thereto, whereby said frames are secured to the plow-standards, draft-chains $h\ h$, and adjustable bars E E', substantially as and for the purposes described.

3. In a cultivator, the frames A A', formed of the angularly-placed pieces 1, 2, 3, 4, 5, 6, and 7, the one 7 being bent, as at $l$, secured to each other by the cultivator-teeth $t$, and provided with means, substantially such as described, for securing said frames to an ordinary double-shovel cultivator or plow, for the purposes specified.

In testimony that we claim the foregoing we affix our signatures in the presence of two witnesses.

EMANUEL REICHART.
JACOB P. REICHART.

Witnesses:
M. H. HEGARTY,
THOMAS MCDONALD.